United States Patent
Trulove

(10) Patent No.: US 7,681,525 B1
(45) Date of Patent: Mar. 23, 2010

(54) ERGONOMIC ANGULAR-SHAPED HORSE-ANIMAL FEEDER

(76) Inventor: Karen L. Trulove, 3146 County Rd. 115, Glenwood Springs, CO (US) 81601

( * ) Notice: Subject to any disclaimer, the term of this patent is extended or adjusted under 35 U.S.C. 154(b) by 0 days.

(21) Appl. No.: 12/290,332

(22) Filed: Oct. 29, 2008

Related U.S. Application Data

(62) Division of application No. 11/444,758, filed on May 30, 2006, now abandoned.

(51) Int. Cl.
*A01K 1/10* (2006.01)

(52) U.S. Cl. .................................. 119/61.1; 119/58

(58) Field of Classification Search .............. 119/58, 119/61.1, 61.57, 65, 68, 69, 52.1, 57.4, 60, 119/61.4, 61.5; D30/121, 131
See application file for complete search history.

(56) References Cited

U.S. PATENT DOCUMENTS

| | | | | |
|---|---|---|---|---|
| 487,003 | A * | 11/1892 | Doolan | 119/61.3 |
| 589,899 | A * | 9/1897 | Kellett | 119/65 |
| 749,717 | A * | 1/1904 | Carpenter | 119/61.1 |
| 993,286 | A * | 5/1911 | Avey | 119/65 |
| 1,368,911 | A * | 2/1921 | Engler | 119/65 |
| 1,881,065 | A * | 10/1932 | Shirley | 119/61.4 |
| 2,011,684 | A * | 8/1935 | Martin | 119/51.5 |
| 2,675,782 | A * | 4/1954 | Lage | 119/61.1 |
| 2,691,362 | A * | 10/1954 | Moyer et al. | 119/61.1 |
| 3,683,861 | A * | 8/1972 | Bauspies | 119/61.57 |
| D311,612 | S * | 10/1990 | Fuller | D30/131 |
| D397,526 | S * | 8/1998 | Sheaffer | D30/119 |

* cited by examiner

*Primary Examiner*—Kimberly S Smith
(74) *Attorney, Agent, or Firm*—Edwin H. Crabtree; Ramon L. Pizarro

(57) ABSTRACT

An ergonomic horse/animal feeder adapted for receiving a lower portion and jaw of two or more horse heads in a natural headset. The feeder is angular in shape and includes a horizontal bottom, a backside, an ergonomic feed front side, a first side and an opposite second side. A curved lip is disposed around a top of the angular sides. The backside is angled upwardly and outwardly from the horizontal bottom in a range of 60 to less than 90 degrees from the horizontal. A lower portion of the feed front side of the feeder is angled upwardly in a range of 60 to less than 90 degrees from the horizontal. An upper portion of the feed front side is angled upwardly and outwardly in a range of 30 to 60 degrees from the horizontal. This upward and outward angle of the feed front side allows the lower portion of the horse's head and jaw to be received inside the feeder for feeding in the natural headset.

16 Claims, 3 Drawing Sheets

SIDE VIEW

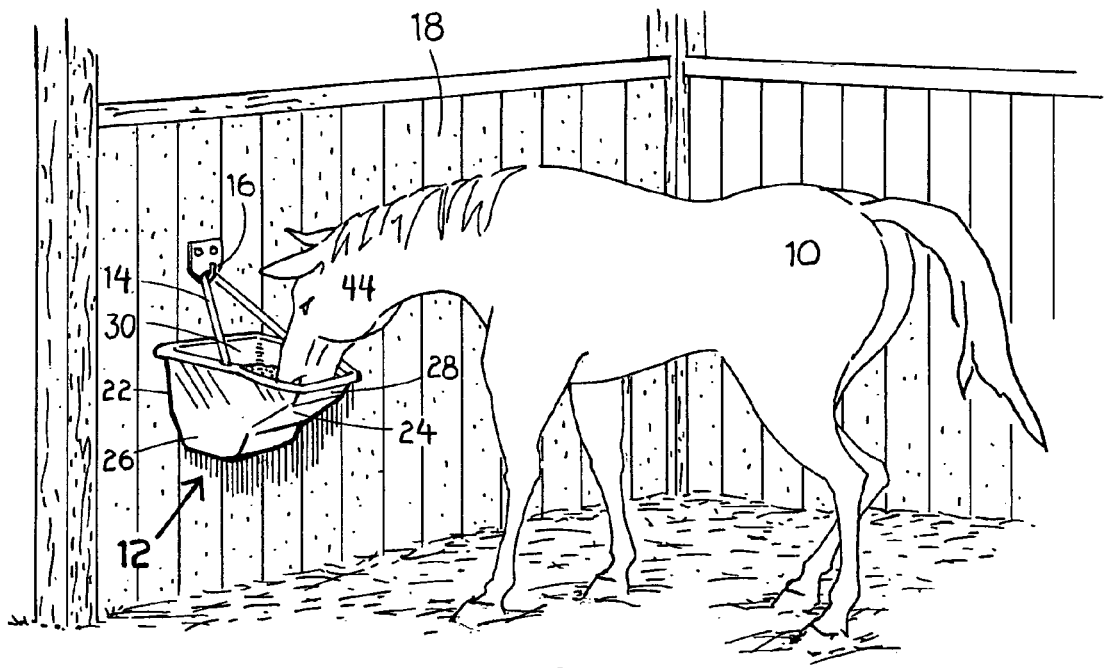
FIG. 1
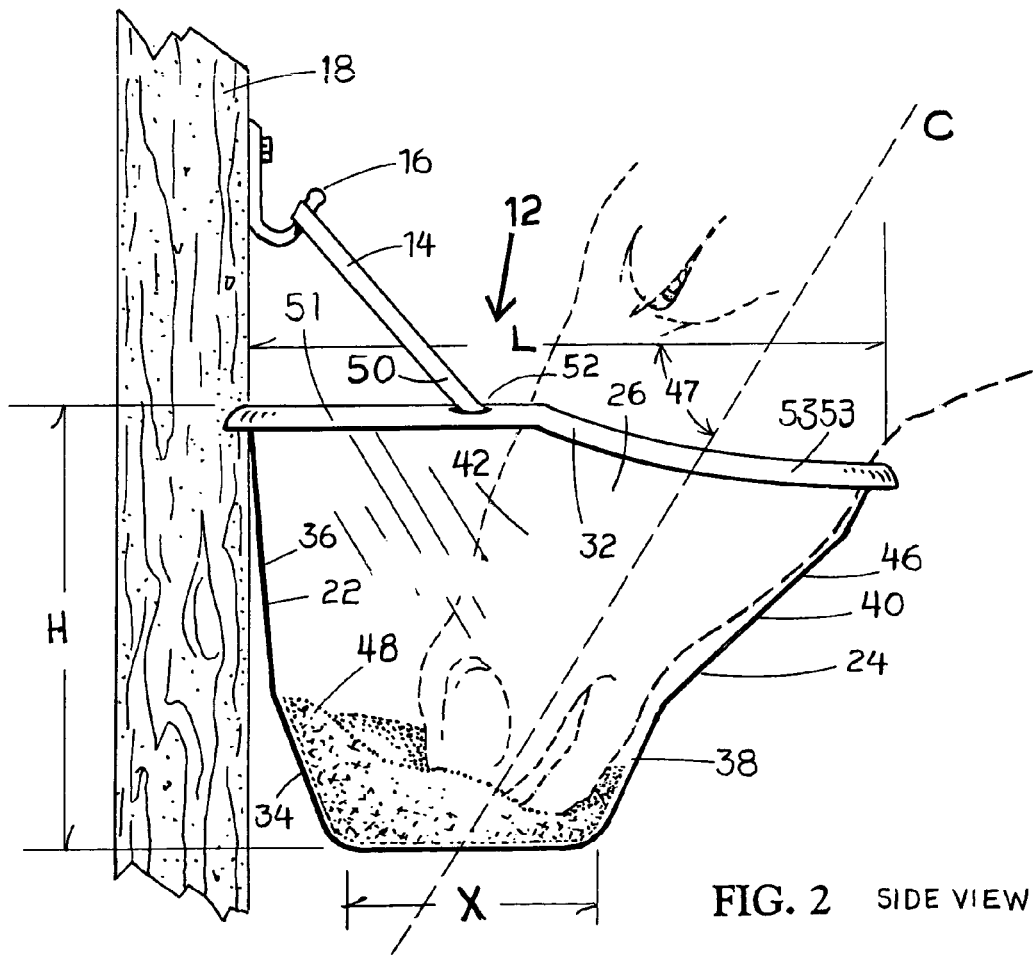
FIG. 2 SIDE VIEW

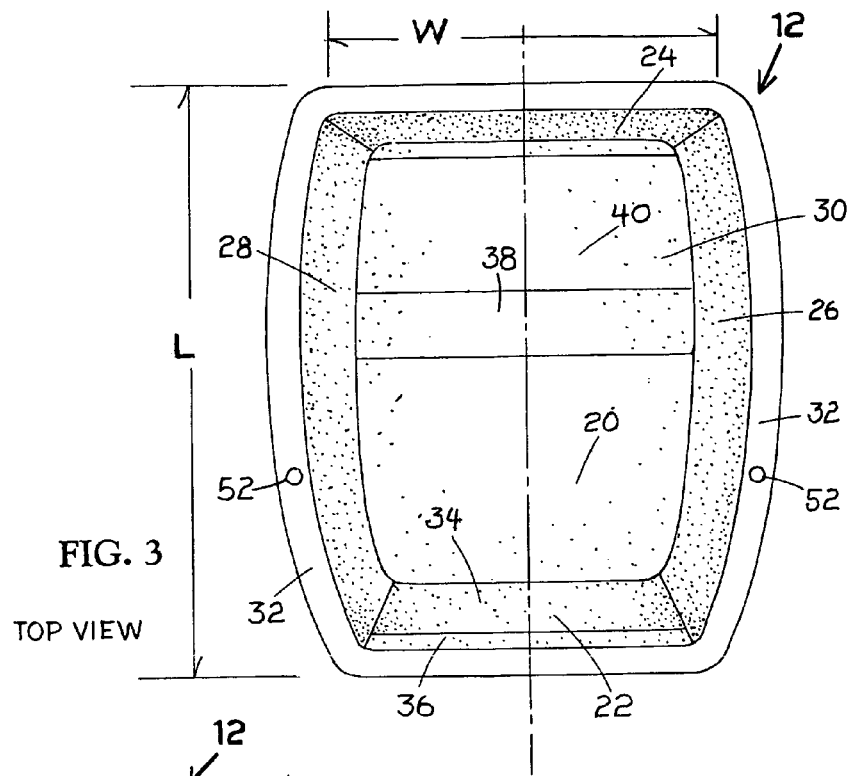
FIG. 3 TOP VIEW
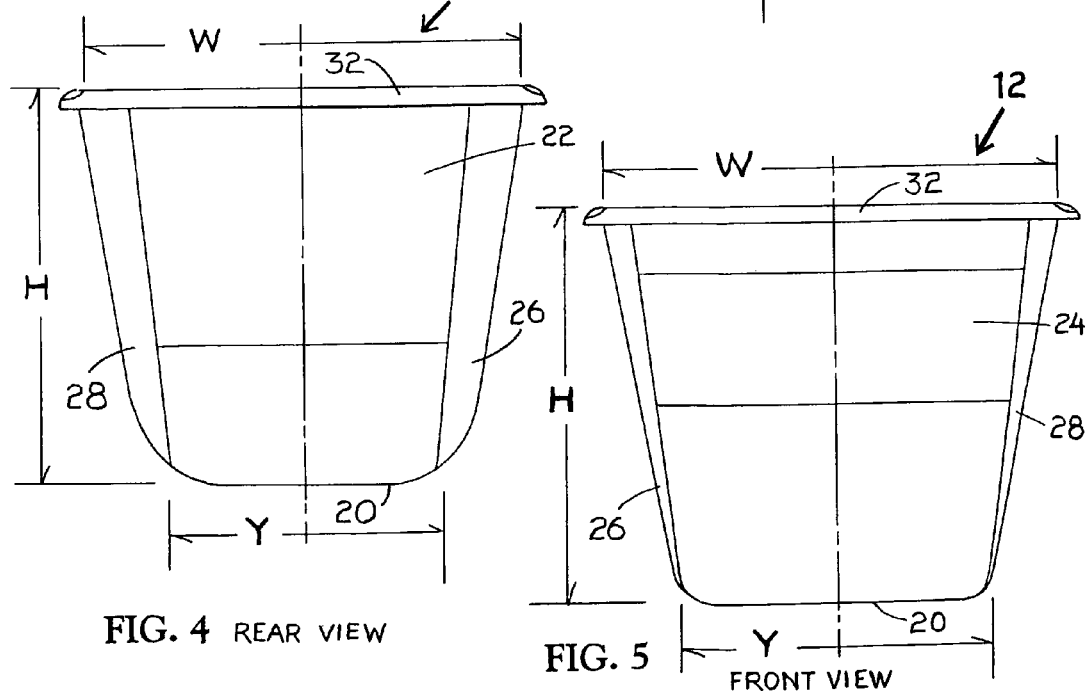
FIG. 4 REAR VIEW
FIG. 5 FRONT VIEW

CORNER BUCKET

CORNER FEEDER

WALL/FENCE FEEDER

FREE-STANDING FEEDER

US 7,681,525 B1

ERGONOMIC ANGULAR-SHAPED HORSE-ANIMAL FEEDER

This patent application is a divisional patent application based on and claiming the benefit of an earlier filed application Ser. No. 11/444,758, filed on May 30, 2006, now abandoned by the subject inventor, and having a title of "ERGONOMIC ANGULAR-SHAPED HORSE/ANIMAL BUCKET"

BACKGROUND OF THE INVENTION (a) Field of the Invention

This invention relates to a feed bucket for animals and more particularly, but not by way of limitation, to a feed bucket designed as an ergonomic, angular-shaped feed bucket providing a natural head set for receiving a lower portion of a horse head inside the bucket. The invention can also include additional embodiments wherein the bucket is enlarged into an animal feeder for one or more animals and having a ergonomic, angular-shape.

(b) Discussion of Prior Art

Heretofore, there have been a number of patented horse and animal feeding apparatus providing improvements over a standard round feed bucket or a feed trough. For example, U.S. Pat. No. 4,976,222 to Cooke, U.S. Pat. No. 5,036,799 to Jordan et al., U.S. Pat. No. 4,292,930 to Olsen, U.S. Pat. No. 5,887,544 to Popelier and Des. 287,771 to Kimble disclose a variety of horse feeders and related feed devices. None of the above mentioned prior art animal feeders described the unique features, structure and function of the subject ergonomic feed bucket as described herein for feeding animals and in particular a horse.

SUMMARY OF THE INVENTION

In view of the foregoing, it is a primary objective of the subject invention to provide a feed bucket that is a natural headset for receiving a lower portion of a horse's head and jaw. Also, a width of the bucket accommodates a squareness of a width of the horse jaw.

Another object of the invention is the bucket is angular in design with a horizontal bottom and sides tapered upwardly and outwardly for gravity feeding the feed onto the bottom of the bucket. This feature makes the feed and grain more available to the horse or animal, thus helping to eliminate an animal's need to shake, invert, paw or otherwise move the bucket to reach the feed. Also, the bucket design makes it more difficult for the horse to try and sort out feed supplements, salts, medication, etc. given to the animal with his or her feed.

Yet another object of the invention is the bucket includes an angular-shaped backside. The angular-shaped backside adds stability to the bucket, when compared to a round feed bucket, and the bucket is hung or mounted on a fence post, wall or panel.

Still another object of the feed bucket is the natural headset design eliminates the animal from having to hold his or her head vertically downward, which is an unnatural eating position when feeding inside the bucket.

Yet another object of the invention is the bucket can be enlarged and formed into an animal feeder for one or more animals. The feeder can be mounted on a wall or fence, in a corner of a horse stall or it can be free standing.

The subject ergonomic feed bucket is adapted for receiving a lower portion and jaw of a horse in a natural headset. The feed bucket is angular in shape and includes a horizontal bottom, a backside, a feed front side, a first side and an opposite second side. A curved lip is disposed around a top of the angular sides. The backside is angled upwardly and outwardly from the horizontal bottom an initial angle in a range of 60 to 90 degrees from the horizontal. A lower portion of the feed front side of the bucket is angled upwardly in a range of 60 to 90 degrees from the horizontal. An upper portion of the feed front side is angled upwardly and outwardly in a range of 30 to 60 degrees from the horizontal. This upward and outward angle of the feed front side allows the lower portion of the horse's head and jaw to be received inside the bucket for feeding in the natural headset.

These and other objects of the present invention will become apparent to those familiar with the use of animal feed buckets, animal feeders and related feed equipment when reviewing the following detailed description, showing novel construction, combination, and elements as herein described, and more particularly defined by the claims, it being understood that changes in the embodiments of the disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 1 is a perspective view of a full grown horse feeding inside the subject ergonomic feed bucket. The bucket is shown with a bucket bail suspended on a hook attached to a side of a horse stall wall.

FIG. 2 is an enlarged side view of the bucket shown in FIG. 1. In this drawing, the lower portion of the horse's head and jaw are shown in dashed lines and received inside the bucket in a natural headset for feeding to the bottom of the bucket.

FIG. 3 is a top view of feed bucket illustrating typical dimensions of the width and length of the bucket.

FIG. 4 is a rear view of the backside of the feed bucket illustrating typical dimensions of the width and height of the bucket.

FIG. 5. is a front view of the feed front side of the feed bucket illustrating typical dimensions of the width and height of the bucket.

DETAILED DESCRIPTION OF THE PREFERRED EMBODIMENTS

Figure 6:
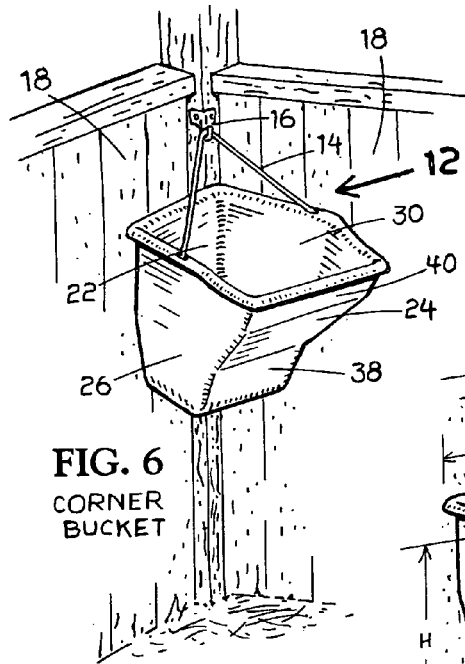
FIG. 6 is a perspective view of the feed bucket wherein the backside is divided and formed into a right angle for turning it into a corner bucket and received in a corner of a horse stall.

In FIG. 1, a perspective view of a full-grown horse 10 is shown feeding inside the subject ergonomic feed bucket, having general reference numeral 12. The feed bucket 12 is shown with a feed bail 14 suspended on a hook 16 attached to a side of a horse stall wall 18. The feed bucket 12 is integrally formed out of plastic or like material and is angular is shape. The bucket bail 14 can have an inverted "V" or inverted "C" shape.

The feed bucket 12 includes a horizontal, angular-shaped bottom 20, an angular-shaped backside 22, an ergonomic, angular-shaped feed front side 24, an angular-shaped first side 26, an angular-shaped opposite second side 28 and an open top 30. A curved lip 32 is disposed around a top of the four angular sides for adding overall strength to the bucket 12.

In FIG. 2, an enlarged side view of the bucket 12 is shown. In this drawing, a lower portion 34 and an upper portion 36 of the backside 22 is angled upwardly and outwardly from the horizontal bottom 20 at an angle in a range of 60 to 90 degrees from the horizontal. A lower portion 38 of the ergonomic, feed front side 24 is angled upwardly in a range of 60 to 90 degrees from the horizontal. An upper portion 40 of the feed front side 24 is angled upwardly and outwardly in a range of 30 to 60 degrees from the horizontal. This upward and outward angle of the feed front side 24 allows a lower portion 42 of a horse's head 44 and a jaw 46 to be received inside the bucket 12. Because of the unique contour of the ergonomic feed front side 24, the bottom of the horse's mouth and the bottom of the horse's jaw rest next to the inside of the feed front side 24. This important feature allows for feeding in a natural headset and without the horse 10 having to hold his or her head 44 downwardly and vertically in an unnatural head position.

It should be noted, the horse's head 44 is disposed along a center line C-C, which is at an angle 47. The angle 47 is in a range of 30 to 60 degrees from the horizontal. The center line C-C is substantially parallel to the angled feed front side 24, so that the horse 10 can easily eat feed 48 down the top of the horizontal bottom 20 without having to tilt his or her head into a vertical position.

Also shown in this drawing is a bottom 50 of the bail 14 received through bail holes 52 and pivotally attached to a rear portion 51 of the curved lip 32 at the top of the first and second sides 26 and 28. A front portion 53 of the curved lip 32 at the top of the first and second sides is concave in shape for ease in receiving the animal's head inside the open top 30 of the bucket 12. The bottom 50 to the bail 14 is position on the lip 32 approximately 1/3 of a length "L" of a top of the bucket 12. In this manner, the bail 14 is offset to reduce the chance of the animal hitting his or her head when feeding from the feed bucket 12. The length "L" can be in a range of 12 to 24 inches. Also a shorter length "X" of the bottom 50 can be in a range of 6 to 12 inches. A height "H" of the bucket 12 can be in a range of 6 to 24 inches. A width "W" of the bucket 12 is shown in FIGS. 3-5. With these typical dimension, as shown in the drawings, the feed bucket 12 can be made in small, medium, large and extra-large sizes for different size horses and other animals.

In FIG. 3, a top view of the open top feed bucket 12 is shown. The width "W" of the top of the bucket 12, between the first and second sides 26 and 28, can be in a range of 8 to 16 inches and is sufficient in size to provide for a squareness of the horse's jaw 46 to be received inside the bucket. In this drawing, the top of the horizontal bottom 20 is shown inside the interior of the bucket 12. Also shown is the downwardly sloping backside 22 including its lower portion 34 and upper portion 36. Further, the downwardly sloping feed front side 24 is shown with its lower portion 38 and upper portion 40.

In FIG. 4, a rear view of the backside 22 of the feed bucket 12 is illustrated and showing dimensions of the width "W" and the height "H" of the bucket 12. A width "Y" of the horizontal bottom is shown and having a range of 6 to 10 inches.

In FIG. 5, a front view of the front feed side 24 of the feed bucket 12 is illustrated and showing dimensions of the widths "W" and "Y" and the height "Y" of the bucket 12.

In FIGS. 4 and 5, the first side 26 and the opposite, second side 28 are shown angled upwardly and outwardly from the horizontal bottom 20 and at an angle in a range of 60 to 90 degrees from the horizontal.

In FIG. 6, a perspective view of the subject feed bucket 12 is shown wherein the backside 22 is divided and formed at a right angle along its height "H" for forming a corner bucket. In this embodiment of the bucket 12, the corner bucket 12 can be attached to the horse stall wall 18 using the hook 16 and received in a corner of a horse stall. The ergonomic, feed front side 24 and the first and second sides 26 and 28 are similar in size and shape as disclosed in FIGS. 1-5.

Figure 7:
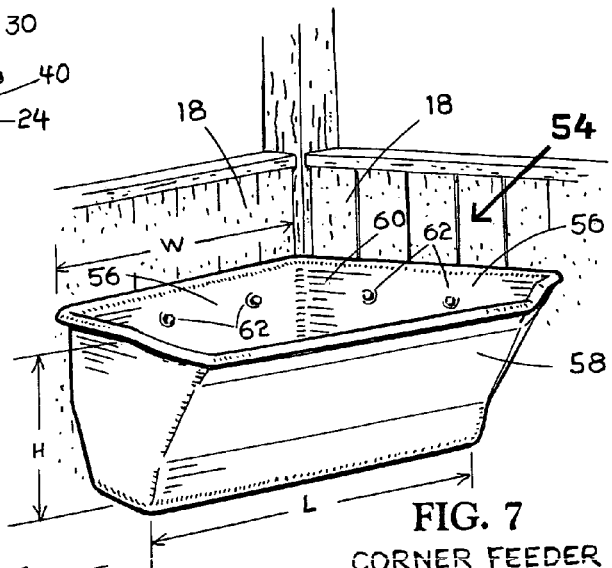
FIG. 7 is a perspective view of the feed bucket enlarged into an animal feeder. A backside of the animal feeder is divided at right angles for turning the feeder into a corner feeder and received in a corner of a horse stall.

In FIG. 7, a perspective view of another embodiment of the feed bucket is shown as an enlarged animal feeder. The animal feeder has a general reference numeral 54. A backside 56 of the animal feeder 54 is divided and formed into a right angle for turning the feeder into a corner feeder and received in a corner next to two horse stall walls 18. A key feature of the animal feeder is an ergonomically-shaped feed front side 58, which is similar to the feed front side 24, shown in FIGS. 1-6. The feeder 58, when looking downwardly into an open top 60, has a triangular shape. A pair of bolts 62 are used for securing the feeder 54 to the horse stall walls 18. The height "H" of the feeder 54 is in a range of 12 to 36 inches, the width "W" of the two backsides 56 is in a range of 12 to 24 inches and the length "L" of the feed front side 24 is in a range of 24 to 48 inches.

Figure 8:
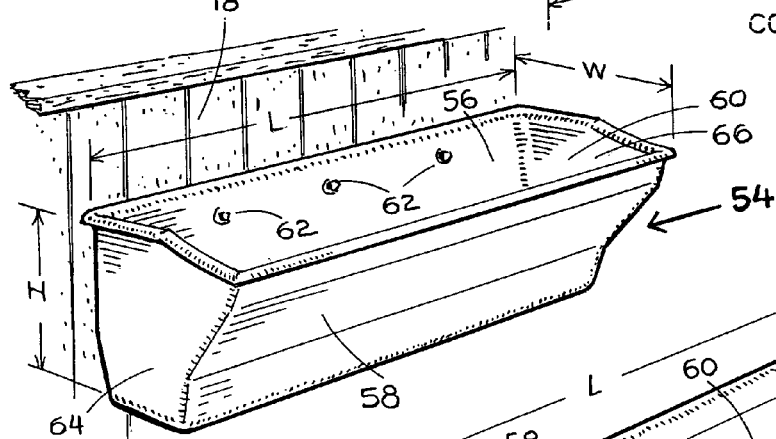
FIG. 8 is a perspective view of the feed bucket enlarged into an animal feeder. The animal feeder is attached to a horse stall wall or fence.

In FIG. 8, a perspective view of another embodiment of the animal feeder 54 is shown attached to the horse stall wall 18 using bolts 62. In this example, the feeder 54 is designed as a wall/fence feeder for attaching to a wall or fence. This feeder includes a backside 56 disposed against a portion of the wall 18 and attached thereto, a first side 64 and a second side 66. The feed front side 58 is attached to the front of the first and second sides 64 and 66. The height "H" of the feeder 54 is in a range of 12 to 36 inches, a length "L" of the backside 56 and the feed front side 58 is in a range of 24 to 60 inches and the width "W" of the first and second sides is in a range of 12 to 24 inches. In this drawing, the feeder 54 is shown with a horizontal bottom 68.

Figure 9:
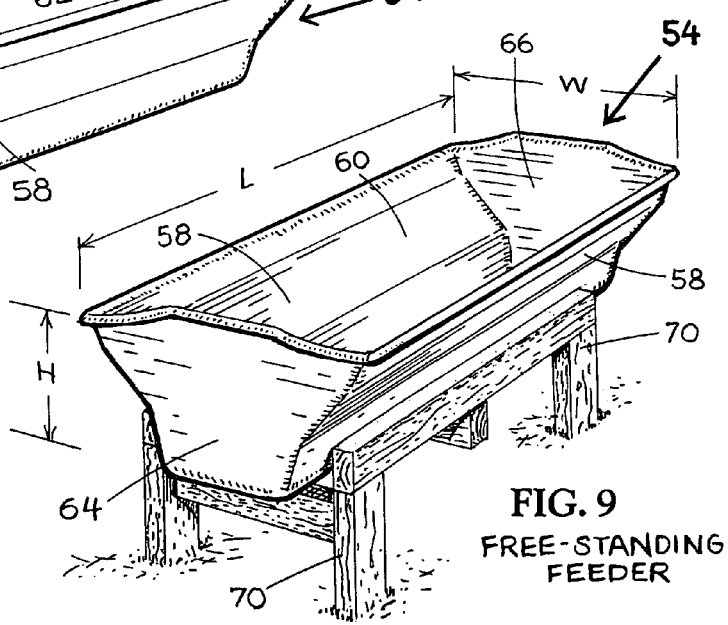
FIG. 9 is a perspective view of the feed bucket enlarged into an animal feeder. The animal feeder is free-standing on legs for allowing one or more animals to feed on opposite side of the free-standing feeder.

In FIG. 9, a perspective view of yet another embodiment of the animal feeder 54 is shown as a free-standing feeder with the horizontal bottom 68 mounted on top of support legs 70 for holding the animal feed aboue the ground. This type of feeder allows one or more horses or other animal to feed therein and using a pair of oppositely disposed, identical, feed front sides 58 joined together using the first and second sides 64 and 66. In this example, the backside 56 has been formed into a feed front side 58. The animal feeder 54 has a height "H" in a range of 12 to 36 inches, a length "L" of the two feed front sides 58 in a range of 24 to 60 inches and a width "W" of the first and second sides in a range of 24 to 48 inches.

It is important to note that the ranges of the dimensions of the height "H", the width "W" and the length "L" of the bucket 12 and the animal feeder 54, shown in the above discussed drawings, can easily be varied to be greater or less than described without departing from the spirit and scope of the invention.

While the invention has been particularly shown, described and illustrated in detail with reference to various preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A wall/fence animal feeder integrally formed and adapted for receiving a lower portion and jaw of two or more horse heads in a natural headset, the animal feeder adapted for mounting on a horse stall wall or fence, the feeder comprising:

an elongated horizontal bottom and an open top;

an elongated backside, said backside angled upwardly and outwardly from said horizontal bottom;

an elongated ergonomic feed front side, said feed front side having a lower portion and an upper portion, the lower portion extending at a fixed internal angle upwardly and outwardly in a range of greater than 90 degrees to 120 degrees from said horizontal bottom, the upper portion extending at a fixed internal angle upwardly and outwardly from the lower portion in a range of 120 degrees to 150 degrees from said horizontal bottom, the upward and outward lower portion and upper portion of said feed front side adapted for receiving the lower portion and jaw of the two or more horse heads inside the animal feeder in a natural headset, the fixed internal angle of the lower portion of the feed front side allowing the horse head to feed downwardly to said horizontal bottom thereby eliminating the need for the horse head to be held vertically downward when feeding;

a first side, said first side angled upwardly and outwardly from said horizontal bottom; and a second side, said second side angled upwardly and outwardly from said horizontal bottom.

2. The animal feeder as described in claim 1 further including a plurality of bolts for securing said elongated backside to the horse stall wall or fence.

3. The animal feeder as described in claim 1 wherein a lower portion of said backside is angled internally upwardly and outwardly in a range of greater than 90 degrees to 120 degrees from said horizontal bottom.

4. The animal feeder as described in claim 1 wherein said first and second sides are angled internally upwardly and outwardly in a range of greater than 90 degrees to 120 degrees from said horizontal bottom.

5. The animal feeder as described in claim 1 wherein a height "H" of said backside, said feed front side and said first and second sides is in a range of 12 to 36 inches, a length "L" of said backside and said feed front side is in a range of 24 to 60 inches and the width "W" of said first and second sides is in a range of 12 to 24 inches.

6. The animal feeder as described in claim 1 wherein said backside is angled internally upwardly and outwardly in a range of greater than 90 degrees to 120 degrees from said horizontal bottom.

7. The animal feeder as described in claim 1 wherein said first and second sides are angled internally upwardly and outwardly in a range of greater than 90 degrees to 120 degrees from said horizontal bottom.

8. A free standing animal feeder integrally formed and adapted for receiving a lower portion and jaw of two or more horse heads in a natural headset, the animal feeder disposed above a ground surface, the animal feeder comprising:

an elongated horizontal bottom and an open top;

an elongated backside, said backside angled upwardly and outwardly from said horizontal bottom;

an elongated ergonomic feed front side, said feed front side having a lower portion and an upper portion, the lower portion extending at a fixed internal angle upwardly and outwardly in a range of greater than 90 degrees to 120 degrees from said horizontal bottom, the upper portion extending at a fixed internal angle upwardly and outwardly from the lower portion in a range of 120 degrees to 150 degrees from said horizontal bottom, the upward and outward lower portion and upper portion of said feed front side adapted for receiving the lower portion and jaw of the two or more horse heads inside the animal feeder in a natural headset, the fixed internal angle of the lower portion of the feed front side allowing the horse head to feed downwardly to the horizontal bottom thereby eliminating the need for the horse head to be held vertically downward when feeding;

a first side, said first side angled upwardly and outwardly from said horizontal bottom;

a second side, said second side angled upwardly and outwardly from said horizontal bottom; and feeder support means engaging said horizontal bottom, said feeder support means for holding the animal feeder above the ground surface.

9. The animal feeder as described in claim 8 wherein said backside is an ergonomic backside having a lower portion and an upper portion, the lower portion extending at a fixed internal angle upwardly and outwardly in a range of greater than 90 degrees to 120 degrees from said horizontal bottom, the upper portion extending at a fixed internal angle upwardly and outwardly from the lower portion in a range of 120 degrees to 150 degrees from said horizontal bottom, the upward and outward lower portion and upper portion of said backside adapted for receiving the lower portion and jaw of the two or more horse heads inside the animal feeder in a natural headset, the fixed internal angle of the lower portion of the back side allowing the horse head to feed downwardly to said horizontal bottom thereby eliminating the need for the horse head to be held vertically downward when feeding.

10. The animal feeder as described in claim 8 wherein said feeder support means is a plurality of vertical legs and frame for holding the animal feeder above the ground surface.

11. The animal feeder as described in claim 8 wherein a height "H" of said backside, said feed front side and said first and second sides is in a range of 12 to 36 inches, a length "L" of said backside and said feed front side is in a range of 24 to 60 inches and the width "W" of said first and second sides is in a range of 12 to 24 inches.

12. A corner feeder integrally formed and adapted for receiving a lower portion and jaw of two or more horse heads in a natural headset, the corner feeder adapted for mounting in a corner of a horse stall wall or fence, the feeder comprising:

an elongated horizontal bottom and an open top;

an elongated backside, said backside angled upwardly and outwardly from said horizontal bottom, said backside divided into a right angle, said backside adapted for receipt against sides of a corner of the horse stall or fence;

an elongated ergonomic feed front side, said feed front side having a lower portion and an upper portion, the lower portion extending at a fixed internal angle upwardly and outwardly in a range of greater than 90 degrees to 120 degrees from said horizontal bottom, the upper portion extending at a fixed internal angle upwardly and outwardly from the lower portion in a range of 120 degrees to 150 degrees from said horizontal bottom, the upward and outward lower portion and upper portion of said feed front side adapted for receiving the lower portion and jaw of the two or more horse heads inside the animal feeder in a natural headset, the fixed internal angle of the lower portion of the feed front side allowing the horse head to feed downwardly to said horizontal bottom thereby eliminating the need for the horse head to be held vertically when feeding;

a first side, said first side angled upwardly and outwardly from said horizontal bottom; and a second side, said second side angled upwardly and outwardly from said horizontal bottom.

13. The animal feeder as described in claim 12 further including a plurality of bolts for securing said right angle backside to the corner of the horse stall wall or fence.

14. The animal feeder as described in claim 12 wherein a lower portion of said right angle backside is angled internally upwardly and outwardly in a range of greater than 90 degrees to 120 degrees from said horizontal bottom.

15. The animal feeder as described in claim 12 wherein said first and second sides are angled internally upwardly and outwardly in a range of greater than 90 degrees to 120 degrees from said horizontal bottom.

16. The animal feeder as described in claim 12 wherein a height "H" of said right angle backside, said feed front side and said first and second sides is in a range of 12 to 36 inches, a length "L" of said backside and said feed front side is in a range of 24 to 60 inches and the width "W" of said first and second sides is in a range of 12 to 24 inches.

* * * * *